United States Patent

Olmstead

[15] 3,681,708

[45] Aug. 1, 1972

[54] PSEUDO-RANDOM FREQUENCY GENERATOR

[72] Inventor: Merlin E. Olmstead, Baltimore, Md.

[73] Assignee: The Bendix Corporation

[22] Filed: April 29, 1969

[21] Appl. No.: 820,230

[52] U.S. Cl. ........................331/78, 178/22, 325/32, 325/122

[51] Int. Cl. ..............................................H03b 29/00

[58] Field of Search..................................331/1, 78; 325/32–35, 122

[56] References Cited

UNITED STATES PATENTS 3,484,712 12/1969 Foote et al........................331/1

*Primary Examiner*—Benjamin A. Borchelt
*Assistant Examiner*—H. A. Birmiel
*Attorney*—Plante, Arens, Hartz, Hix and Smith, Bruce L. Lamb, William G. Christoforo and Lester L. Hallacher

[57] ABSTRACT

A binary pseudo-random frequency generator in which a shift register is continuously strobed by a clock and has its informational content altered in accordance with its acquired state. A variable count divider counts down to zero from a number set therein from information received from the shift register at the divider zero count in response to frequency signals received from a voltage controlled oscillator. Divider zero counts are also compared in a phased lock loop with a reference frequency to set the voltage controlled oscillator frequency.

17 Claims, 1 Drawing Figure

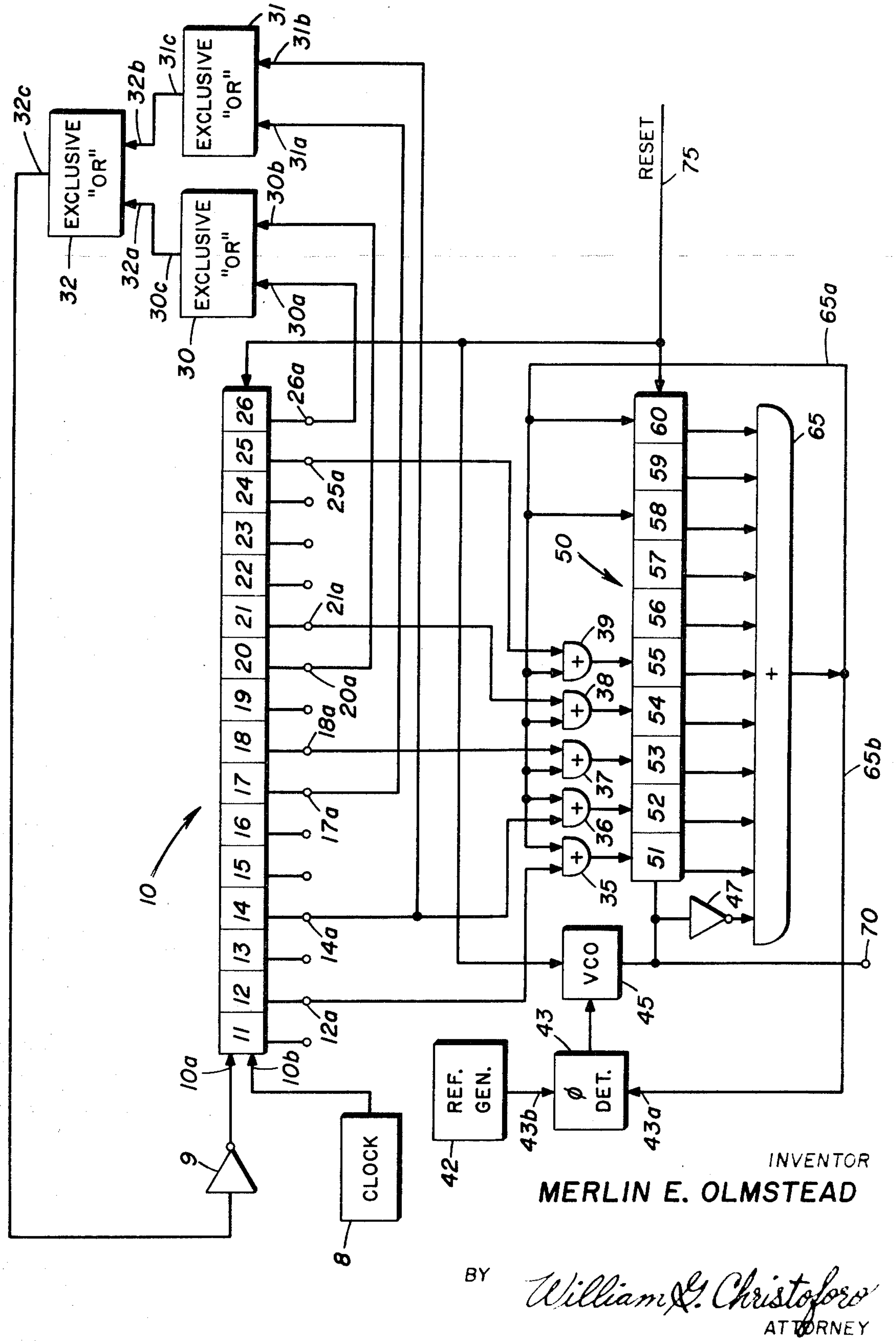
INVENTOR
MERLIN E. OLMSTEAD
BY *William G. Christoforo*
ATTORNEY

PSEUDO-RANDOM FREQUENCY GENERATOR

BACKGROUND OF THE INVENTION

The present invention relates to pseudo-random frequency generators and more particularly to pseudo-random frequency generators which operate in accordance with digital principles.

It is often desirable when transmitting confidential messages over a transmission medium between remote stations to reduce the message at the transmitting station to an unintelligible form before transmission and to reconstruct the message into the original form upon receipt at the receiving station in order to prevent the message from being readily understood if it is intercepted while in transit. Where the message has been reduced to a conventional decodable electrical frequency at the transmitting station, a degree of privacy can be accorded to the message by translating the message frequency into a frequency band not normally associated with the type of message being transmitted and additionally by constantly varying the translating frequency in accordance with a pseudo-random schedule. To render the received message intelligible at the receiving station, it is necessary to translate the received frequency by the same amount but in an opposite direction as the original frequency was translated at the transmitting station. For example, if a first portion of the original frequency is shifted upward 500 hertz and a second portion of the original frequency is shifted upward 1,000 hertz, then, at the receiving station, the first portion of the message must be shifted downward 500 hertz and the second portion shifted downward 1,000 hertz.

Frequency translation is accomplished by combining a message frequency with the translating frequency in a mixer and filtering to choose the desired sideband. If the desired sidebands are preselected by the system designer by a suitable choice of filters, it is only necessary to provide at both the transmitting and receiving stations simultaneously, identical translating frequencies which vary in a random-like manner.

SUMMARY OF THE INVENTION

It is an object of this invention to provide a pseudo-random frequency generator employing digital techniques.

It is another object of this invention to provide a frequency generator whose output frequency varies in accordance with a predetermined pseudo-random schedule.

Another object of this invention is to provide a pseudo-random frequency generator of the type described which can be easily reset to a predetermined initial state.

These and other objects of the invention which will become apparent from a reading of the following embodiment of the invention and claims are achieved by providing a digital shift register of predetermined length which changes state in a random-like manner so as to generate on selected output taps thereof a pseudo-random succession of binary numbers which are gated into a variable count divider by a zero count signal generated when the divider attains a zero count. The variable count divider is counted down by a voltage controlled oscillator whose frequency is controlled in a phase locked loop wherein the zero count signals are compared against a reference frequency. In this manner, the frequency generated by the voltage controlled oscillator, which is the basic output frequency of the device, will vary in a manner which is determined mainly by the binary numbers appearing on the output taps of the shift register, which, as has been mentioned, are varying in a random-like but predictable manner. Thus, two or more identical pseudo-random frequency generators of this type will track one another, that is, will provide identical frequency outputs simultaneously with one another, if their individual shift registers, variable count dividers and voltage controlled oscillators are reset simultaneously to identical conditions.

More particularly, the shift register has its input supplied by a modulo – 2 combination of certain shift register output taps. This shift register arrangement has the capability of generating a cyclic code having a repetition period of $2^n-1$ bits. In the following preferred embodiment a 16-stage shift register is shown together with one of over one hundred possible four tap feedback positions that will give the full period of $2^{16}-1$ bits.

BRIEF DESCRIPTION OF THE DRAWINGS

The FIGURE is a block diagram of the preferred embodiment of the invention.

DESCRIPTION OF THE PREFERRED EMBODIMENT

Referring to the FIGURE, a shift register 10 composed in the conventional manner of 16 binary elements, suitably those binary elements commonly called flip-flops, 11 to 26, is strobed by shift pulses generated by clock 8 which are applied to shift register shift pulse terminal 10*b*. Exclusive OR gates 30 and 31, which are gates known in the art to generate a binary or two level output with two applied binary inputs such that like binary input levels produces one output binary level, while unlike binary input levels produces the other binary level, have their input terminals connected to sample preselected output taps of shift register 10, for example, exclusive OR gate 30 has its input terminals connected to shift register output taps 20*a* and 26*a*, while exclusive OR gate 31 has its input terminals connected to shift register output taps 14*a* and 17*a*. Output terminals 30*c* and 31*c* of exclusive OR gates 30 and 31 respectively are connected to input terminals 32*a* and 32*b* of exclusive OR gate 32, whose output terminal 32*c* is connected through inverting amplifier 9 to flip-flop 11 input terminal 10*a* which comprises the shift register data input terminal in the conventional manner.

Shift register output taps 12*a*, 14*a*, 18*a*, 21*a* and 25*a* are connected as inputs to coincident gates 35 to 39 respectively, which gates are connected to receive a qualifying signal from coincident gate 65 via line 65*a*. Output signals from gates 35 to 39 are used to set flip-flops 51 to 55 respectively, which comprise the five least significant bit elements of variable count divider 50, which is comprised of flip-flops 51 to 60. Any output signal from coincident gate 65 is also applied directly to the set terminals of flip-flops 58 and 60 via line 65*a*. Variable count divider 50 is counted down by counting signals generated by voltage controlled oscillator 45, these counting signals also being applied through inverting amplifier 47 to coincident gate 65 together with variable count divider state signals from each of flip-flops 51 to 60.

Phase detector 43, which together with voltage controlled oscillator 45, variable count divider 50 and coincident gate 65 comprise a phase locked loop for controlling voltage controlled oscillator 45 output frequency, receives as one input at input terminal 43*a* the coincident gate 65 output signals via line 65*b*, and as a second input at input terminal 43*b* a reference frequency from generator 42.

The voltage controlled oscillator output frequency is tapped at terminal 70 and comprises the pseudo-random frequency generator output frequency. The generated output frequency at terminal 70 changes in a pseudo-random manner within a predetermined frequency band in accordance with the principles of operation described below.

OPERATION

Shift register 10 together with exclusive OR gates 30 to 32 comprise a pseudo-random binary number generator in which a predetermined set of numbers will appear in accordance with a random-like schedule at selected shift register output terminals, for example, taps 12*a*, 14*a*, 18*a*, 21*a* and 25*a*. Exclusive OR gates 30 to 32 are arranged so that whenever an odd number of shift register output taps 14*a*, 17*a*, 20*a* and 26*a*, are energized, a logical "1" will be generated by gate 32 and is connected to the inputs of flip-flop 11 so as to enter a logical "00 " into the shift register with the next shift pulse. The shift register contents are shifted in a normal manner by shift pulses generated by clock 8.

A selection of five of the outputs from among the 16 shift register stages are applied to gates 35 to 39. Single outputs from these latter gates control the setting of the first five stages of 10-bit variable count down binary divider 50. Fixed set connections are applied to flip-flops 58 and 60 by a signal on line 65*a* from coincident gate 65. Voltage controlled oscillator 45 generates an output frequency within a preselected frequency bank which is applied to counter 50, which thus counts down to zero. The zero count is detected by coincident gate 65 which is gated open by the oscillator 45 pulse as inverted by inverting amplifier 47. Output of gate 65 is applied along line 65*a* to set a count into counter 50 at flip-flops 58 and 60 directly and through gates 35 to 39 to flip-flops 51 to 55 respectively. The count entering through gates 35 to 39 depend upon the instantaneous state of shift register 10 and may be any number between 00000 and 11111 (decimal 0 to 31). However, since numbers are preset into flip-flops 58 and 60 each time gate 65 opens, the minimum number which is set in counter 50 must be decimal 640 when the number set through gates 35 to 39 is decimal 0 and the maximum possible number set into the counter must be decimal 671 when decimal 31 is entered into the counter through the gates.

The output of gate 65 is also applied to phase detector 43 which also has applied thereto a reference frequency from reference generator 42. The phase detector is designed to generate no error signal to vary the frequency at voltage controlled oscillator 45 when its input frequencies at inputs 43*a* and 43*b* are equal, thus the output frequency of the voltage controlled oscillator 45 must be equal to the reference frequency generated by reference frequency generator 42 times the number set into divider 50. Voltage controlled oscillator output frequency, as previously stated, is applied to count down variable count divider 50 and is additionally tapped at terminal 70 to comprise the pseudo-random frequency output of the device.

Through the use of suitable gating techniques, shift register 10, variable count divider 50 and voltage controlled oscillator 45 can be reset to a predetermined initial condition by a single reset pulse applied to line 75 in a manner well known to those skilled in the art. If this reset pulse is applied simultaneously to two or more identical pseudo-random frequency generators of the type herein described, the output frequencies of those generators so reset will track one another.

The invention claimed is:

1. Means for generating pseudo-random electrical frequencies comprising:
   - means for generating clock pulses;
   - a binary number generator having output taps, for generating upon said output taps a random-like sequence of binary numbers in response to said clock pulses;
   - binary means for counting electrical frequency signals;
   - means responsive to predetermined counts of said counting means for generating first electrical signals;
   - means responsive to said first electrical signals for entering a binary number related to an instantaneous one of said random-like sequence of binary numbers into said counting means; and,
   - a phase locked loop including said counting means and said first electrical signal generating means, for generating said pseudo-random electrical frequencies in response to said first electrical signals, said frequencies being counted by said counting means.

2. Frequency generating means as recited in claim 1 wherein said binary number generator comprises:
   - a shift register having a plurality of output taps, said random-like sequence of binary numbers appearing on preselected ones thereof, a shift pulse terminal to which said clock pulses are applied, and a data input terminal; and,
   - gating means having input terminals connected to other preselected of said output taps for applying a digital bit to said shift register data input terminal.

3. Frequency generating means as recited in claim 2 wherein said shift register comprises a first cascade of binary elements connected as a shift register and said counting means comprises a second cascade of binary elements connected as a counter.

4. Frequency generating means as recited in claim 1 wherein said phase locked loop comprises in addition to said counting means and said first signal generating means;
   - a source of reference frequencies;
   - a phase detector receiving as inputs said reference frequencies and said first electrical signals for generating an error signal; and,
   - means responsive to said error signal for generating said pseudo-random electrical frequencies.

5. Frequency generating means as recited in claim 1 wherein said phase locked loop comprises in addition to said counting means and said first electrical signal generating means:

a source of reference frequencies;

a phase detector responsive to said reference frequencies and said first signal for generating a voltage signals; and, voltage controlled oscillator means responsive to said voltage signal for generating said pseudo-random electrical frequencies.

6. Frequency generating means as recited in claim 5 with additionally means for resetting said voltage controlled oscillator, said binary number generator and said counting means to a predetermined initial state.

7. Frequency generating means as recited in claim 5 wherein said voltage controlled oscillator means is constrained to generate electrical frequencies within a predetermined frequency band.

8. Means for generating pseudo-random electrical frequencies comprising:

means for generating clock pulses;

a binary number generating means having output taps, for generating upon said output taps a random-like sequence of binary numbers in response to said clock pulses; and, phase locked loop means for generating said pseudo-random electrical frequencies in response to selected ones of said random-like sequence of binary numbers.

9. Means for generating pseudo-random electrical frequencies as recited in claim 8 with additionally means for resetting said binary number generating means and said phase locked loop means to a predetermined initial state.

10. Means for generating pseudo-random electrical frequencies as recited in claim 8 wherein said phase locked loop means comprises:

means for generating an error signal;

means responsive to said error signal for generating said pseudo-random electrical frequencies;

means for counting from a preset number to a predetermined number in response to said pseudo-random electrical frequencies;

means for generating an electrical signal upon said counting means attaining said predetermined number, said means for generating an error signal being responsive to said electrical signal; and, gating means responsive to said electrical signal for setting a number related to one of said random-like sequence of binary numbers into said counting means.

11. Means for generating pseudo-random electrical frequencies as recited in claim 10 wherein said means for generating an error signal comprises:

a source of reference frequencies; and, a phase detector responsive to said reference frequencies and said electrical signal for generating said error signal, said error signal comprising a voltage level signal.

12. Means for generating pseudo-random electrical frequencies as recited in claim 11 wherein said means for generating said pseudo-random electrical frequencies comprises a voltage controlled oscillator controlled by said voltage level signal.

13. Means for generating pseudo-random electrical frequencies as recited in claim 10 wherein said gating means comprises a plurality of dual input coincidence gates, all said gates receiving as one input thereto said electrical signal and each said gate receiving as a second input thereto the binary bit appearing on one of said binary number generating means output taps.

14. Means for generating pseudo-random electrical frequencies as recited in claim 13 wherein said counting means comprises a cascade of binary elements arranged to count from a preset binary number to a predetermined binary number in response to said pseudo-random electrical frequencies, said preset binary number being preset into said counting means from said gating means.

15. Means for generating pseudo-random electrical frequencies as recited in claim 14 wherein each said counting means binary element includes a set terminal and each of said plurality of dual input coincidence gates is connected to a predetermined one of said set terminals.

16. Means for generating pseudo-random electrical frequencies as recited in claim 15 wherein said gating means additionally comprises means for applying said electrical signal directly to other of said set terminals.

17. Means for generating pseudo-random electrical frequencies as recited in claim 16 with additionally means for resetting said voltage controlled oscillator, said counting means and said binary number generating means to predetermined initial states.

* * * * *